UNITED STATES PATENT OFFICE.

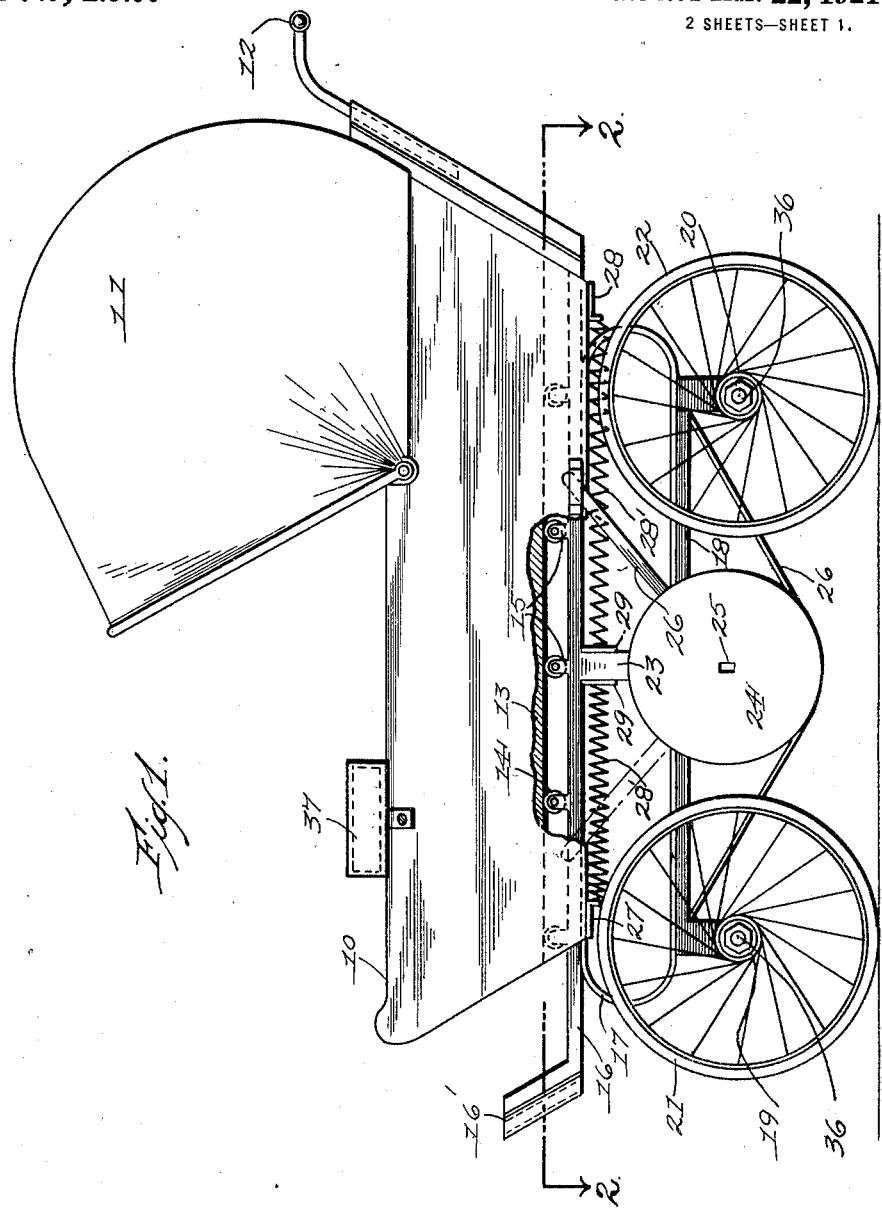

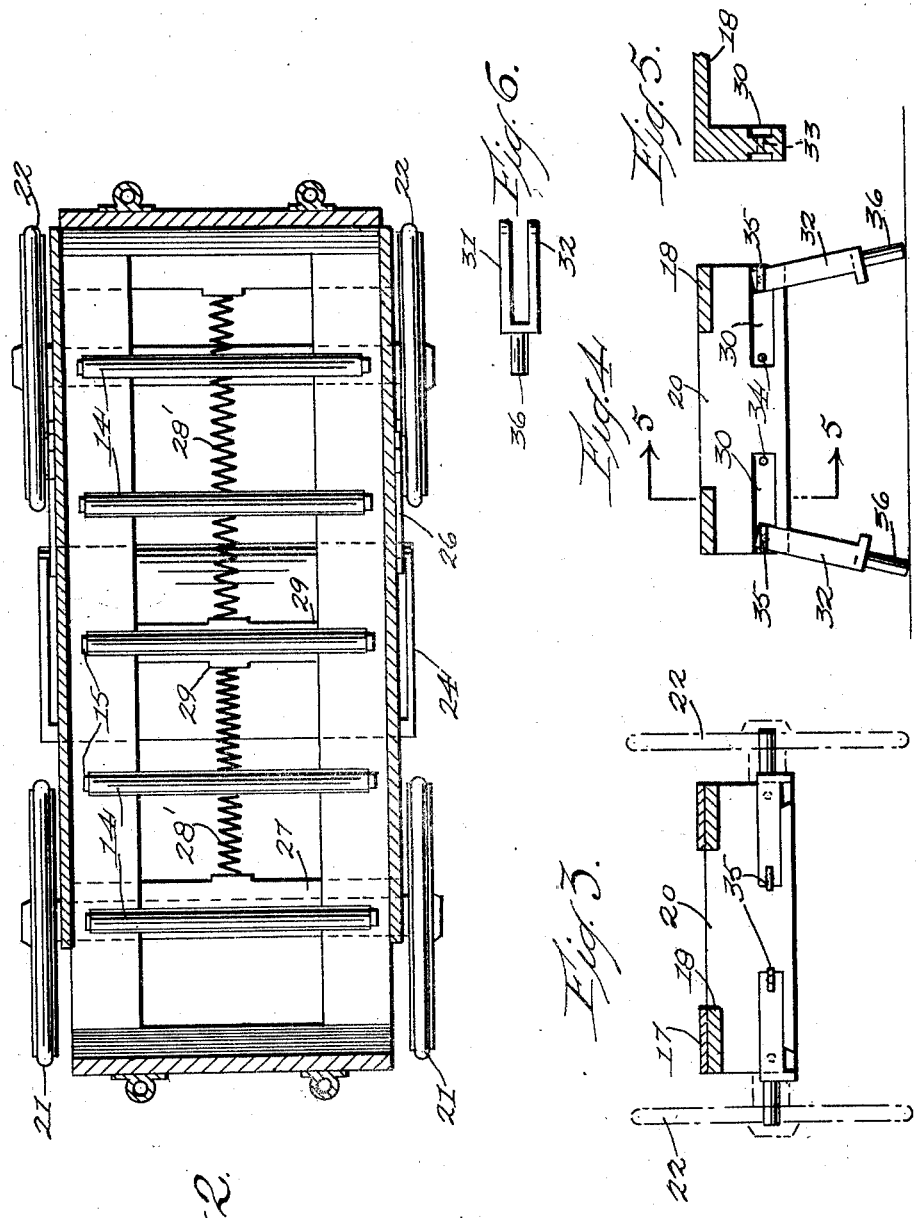

VICTOR GUDOUSKI, OF CHICAGO, ILLINOIS.

COMBINED BABY CARRIAGE, CRADLE, AND CRIB.

1,372,422.   Specification of Letters Patent.   Patented Mar. 22, 1921.

Application filed July 31, 1920. Serial No. 400,466.

*To all whom it may concern:*

Be it known that I, VICTOR GUDOUSKI, a citizen of Lithuania, residing at Chicago, county of Cook, and State of Illinois, have invented certain new and useful Improvements in Combined Baby Carriages, Cradles, and Cribs, of which the following is a specification.

This invention has for its object improvements in baby carriages and particularly the provision of means whereby the carriage can be readily changed into an infant's cradle or into a bed or crib.

A further object of the invention is the provision of automatically operated means for rocking or oscillating the carriage body when changed into a cradle.

A still further object of the invention is to provide axles to which the wheels are readily attached when the carriage is to be used as such and which can be readily changed into bed posts when the carriage is to be used as a crib or cradle.

These and other objects, which will become more fully apparent as the description progresses, are attained by the novel construction and combination of parts hereinafter described, and shown in the accompanying drawings, forming a material part of this disclosure, and in which—

Figure 1 is a side view of a baby carriage constructed according to the present invention.

Fig. 2 is a top plan view upon the bottom of the carriage in section taken along line 2—2 of Fig. 1.

Fig. 3 is a rear view partly in section.

Fig. 4 is a similar view as Fig. 3, with the rear axle changed into bed posts.

Fig. 5 is a section on line 5—5 of Fig. 4, and

Fig. 6 is a detail view of one end of an axle.

The body 10 of the carriage is provided with the customary hood 11 and handle 12 for pushing the carriage, and has a bottom 13 resting upon rollers 14 rotatably secured in suitable bearings 15 on a platform 16 provided with an upwardly inclined front end 16' and resting on the customary springs 17 upon the truck 18 carrying the front axle 19 and the rear axle 20 for the wheels 21 and 22 respectively.

To the platform 16 a bracket 23 is secured carrying a casing 24 for a strong watch spring and a clock work adapted to be wound up by means of a key to be introduced through the key-hole 25; the casing or housing 24 being supported by braces 26 and 26'.

To the lower edges of the body 10 of the carriage brackets 27 and 28 are fastened to which the ends of strong spiral springs 28' are secured, the inner ends of which are secured to plates 29 to both sides of the bracket 23. The clock work within the housing 24, will when its spring is wound up, impart to the carriage body a reciprocatory motion.

The axles 19 and 20 are each provided at their ends with grooves 30 on both sides guiding the movable forked ends 31 and 32 of the axles on both sides of the central web 33 forming the bottom parts of the grooves. This web is provided with openings 34 through which bolts 35 or the like securing means are passed which are adapted to hold the ends 36 of the axles 19 and 20 either in a horizontal position for the reception of the carriage wheels as shown in Fig. 3 or, as for instance shown on Fig. 4, in an inclined position to the axles when the same are to be used as legs of a crib, after the removal of the wheels.

The operation of the device will be perfectly clear from the above description. If the carriage is to be used as a crib, the wheels are removed and the ends 36 of the axles 19 and 20, after the removal of the bolts 35, are turned down in an inclined position to the axles to form legs which are held in position by reëntering the bolts 35 into the outer openings 34. When then the spring of the clock work is wound up, the carriage body will form a cradle which is rocked by the alternating tensioning of one or the other of the springs 28' under the action of the clock work.

The lower portions of the axles are cut away near their ends to allow a turning movement of the ends 38 around the web 33 in order to assume the inclined position of crib legs. A bottle, lunch or diaper box 37 is conveniently secured, as for instance shown in Fig. 1 to the carriage body.

Having thus described my invention what I claim as new and desire to secure by Letters Patent of the United States, is—

1. An axle, particularly for baby carriages of the character described, comprising end pieces normally supporting the carriage wheels and adapted to be turned at an angle to the axle for forming crib posts and means for locking said end pieces in their position.

2. An axle, particularly for baby carriages of the character described, comprising movable end pieces permitting the axles to be changed into crib posts and means for holding the ends of said axles in position for the reception of the wheels of the carriage and in their position as crib posts, inclined to said axle.

3. An axle, particularly for baby carriages of the character described, comprising grooved elements on both sides of said axle near the end thereof, movable forked ends for said axle engaging with their forks the grooves of said elements, bolts passed through the forks of said ends, and the axles at their grooved part for holding said ends normally in horizontal alinement with said axles for the reception and support of the carriage wheels, said ends adapted to be turned with their forked elements around the web forming said grooves and to be secured in inclined position to said axle after the removal of the wheels to constitute crib posts.

In testimony whereof I have affixed my signature.

VICTOR GUDOUSKI.